United States Patent [19]

Matsuura et al.

[11] Patent Number: 5,611,032
[45] Date of Patent: Mar. 11, 1997

[54] NUMERICAL CONTROL UNIT TO SPECIFY MOVEMENT ZONE OF MOVING PART

[75] Inventors: Syuji Matsuura, Kodaira; Kouji Yamamuro, Oshino-mura, both of Japan

[73] Assignee: Fanuc Ltd., Japan

[21] Appl. No.: 379,657

[22] PCT Filed: Jun. 8, 1994

[86] PCT No.: PCT/JP94/00931

§ 371 Date: Feb. 9, 1995

§ 102(e) Date: Feb. 9, 1995

[87] PCT Pub. No.: WO94/29777

PCT Pub. Date: Dec. 22, 1994

[30] Foreign Application Priority Data

Jun. 11, 1993 [JP] Japan ................................ 5-165065

[51] Int. Cl.⁶ .................................................. G06T 3/00
[52] U.S. Cl. ...................... 395/133; 395/326; 364/474.22
[58] Field of Search ........................... 395/133–139, 395/119, 120, 121, 122, 127, 155, 161, 80, 90; 364/474.18, 474.19, 474.2, 474.22–474.26, 474.27–474.37

[56] References Cited

U.S. PATENT DOCUMENTS

| | | | |
|---|---|---|---|
| 4,823,282 | 4/1989 | Yamagami | 395/134 |
| 4,998,196 | 4/1991 | Seki et al. | 364/474.32 |
| 5,095,440 | 3/1992 | Suzuki et al. | 364/474.32 |
| 5,107,414 | 4/1992 | Fukaya et al. | 364/474.32 |
| 5,193,952 | 3/1993 | Tomoo et al. | 364/474.32 |
| 5,411,272 | 5/1995 | Naka et al. | 395/137 X |

FOREIGN PATENT DOCUMENTS

| | | |
|---|---|---|
| 60-189507 | 9/1985 | Japan . |
| 63-236106 | 10/1988 | Japan . |
| 2-311296 | 12/1990 | Japan . |
| 4-57106 | 2/1992 | Japan . |
| 4-164562 | 6/1992 | Japan . |
| 5-265532 | 10/1993 | Japan . |
| 6-124110 | 5/1994 | Japan . |

*Primary Examiner*—Almis R. Jankus
*Attorney, Agent, or Firm*—Staas & Halsey

[57] ABSTRACT

On a screen, a shape is specified by inputting the figure data (I, J, R) specifying the shape, and a zone is specified by specifying at least one side (limit region 0) of the zone divided by contour of the shape. With this method of specifying a zone, the movement zone or the prohibition zone of the moving part being controlled can easily be specified without strictly defining as numerical data the position information about the aftermove position or the movement limit of the moving part to be controlled.

2 Claims, 12 Drawing Sheets

(X,Y) COORDINATES OF POINT IN ZONE
(X,Y) COORDINATES OF POINT ON STRAIGHTLINE

P1~P7: ZONE

FIG. 5

|  | P1 | P2 | P3 | P4 | P5 | P6 | P7 |
|---|---|---|---|---|---|---|---|
| STRAIGHT LINE L1 | y>Y | y<Y | y>Y | y<Y | y>Y | y<Y | y<Y |
| STRAIGHT LINE L2 | y>Y | y>Y | y<Y | y<Y | y<Y | y>Y | y<Y |
| STRAIGHT LINE L3 | y>Y | y>Y | y>Y | y>Y | y<Y | y<Y | y<Y |

FIG. 6

(X,Y) COORDINATES OF POINT IN ZONE
(x,y) COORDINATES OF POINT ON STRAIGHT LINE
d DISTANCE TO CIRCLE CENTER
R CIRCLE RADIUS
P11~P14 ZONE

FIG. 7

|  | P11 | P12 | P13 | P14 |
|---|---|---|---|---|
| STRAIGHT LINE L | y<Y | y<Y | y>Y | y>Y |
| CIRCLE C | d>R | d<R | d<R | d>R |

NUMERICAL CONTROL UNIT TO SPECIFY MOVEMENT ZONE OF MOVING PART

BACKGROUND OF THE INVENTION

1. Field of the Invention

The present invention relates to a method for specifying a zone such as a movement zone or a prohibition zone of a moving part to be controlled.

2. Description of the Related Art

In general, a numerical control unit, etc., designed for controlling the table, tool rest, etc. of the machine tools such as the lathe, machining center, etc. for machining, specifies the aftermove position and the limit of the movement of the moving part to be controlled by numerical data, thereby specifying the machining range, as well as preventing the interference with other parts of the machining and the overrun of the moving part.

Conventionally, in specifying the aftermove position or movement limit of the moving part to be controlled, in addition to the coordinate data of machine coordinates, machine origin, program coordinates, machining origin, etc., the positional information about the aftermove position or movement limit of the moving part to be controlled has been defined accurately as numerical data, and by using these numerical data, a program for giving work instructions such as machining program has been prepared.

However, with the conventional method for specifying a zone of the movement of the moving part to be controlled, there is a problem such that a large amount of calculation work must be done in order to accurately define the position information about the aftermove position or movement limit of the moving part to be controlled.

The increase in the amount of work for specifying a zone of the movement of the moving part to be controlled causes the increase in the amount of work for preparing work program of, for example, zone machining to be formed using the data of the movement zone, and this entails a secondary problem, that is, the fall of the efficiency of work such as zone machining.

SUMMARY OF THE INVENTION

An object of the present invention is to easily perform the specification of the movement zone or the prohibition zone of the moving part to be controlled without requiring the operation for strictly defining as numerical data the position information about the aftermove position or movement limit of the moving part to be controlled.

According to the method of the present invention, in the method for specifying a zone on a screen, a shape for determining the boundary of the zone is specified by inputting shape data for specifying the shape, and at least one side of the zone divided by the contour of the shape is specified, by which a zone is specified on a screen.

The shape for specifying the zone may be a straight line, a circle, or a circular arc. By specifying the shape, the shape of the zone to be specified on a screen is determined, and the boundary line of the zone specified by the contour of shape specified on the screen is determined. By comparing the coordinate data of a point on the boundary line with the coordinate data of a point in the zone on one side or the other side with respect to the boundary line, the specification of one side of the zone or the specification of the other side can be made. Also, one zone can be made a zone in which movement is prohibited, and one zone can be made a zone in which movement is allowed.

DETAILED DESCRIPTION OF THE PREFERRED EMBODIMENTS

[Configuration of the Embodiment of the Present Invention]

Figure 1:
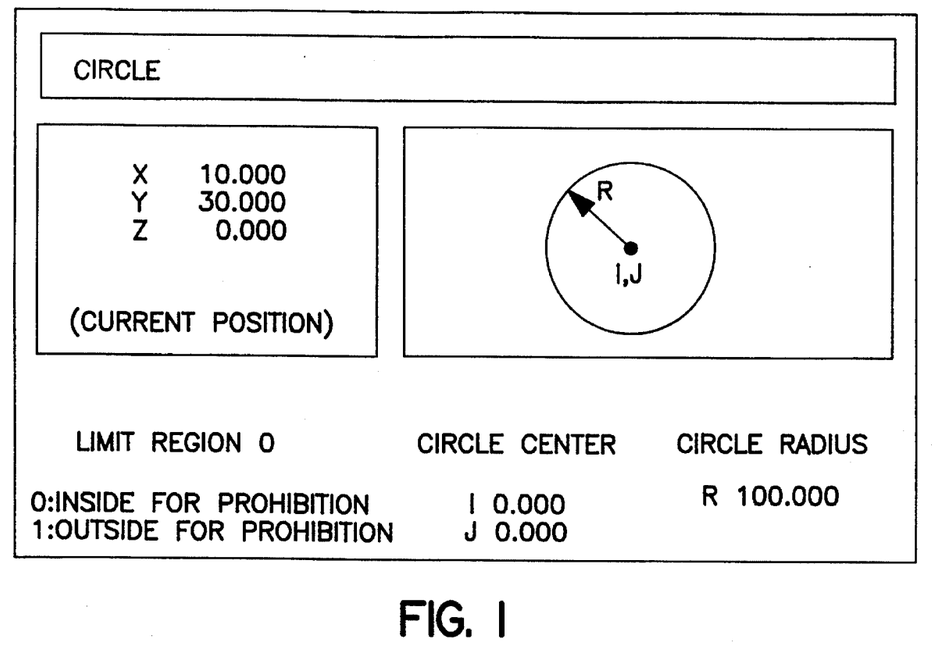
FIG. 1 is a view of a display screen for specifying a zone by a circle in accordance with the embodiment of the present invention.
Figure 2:
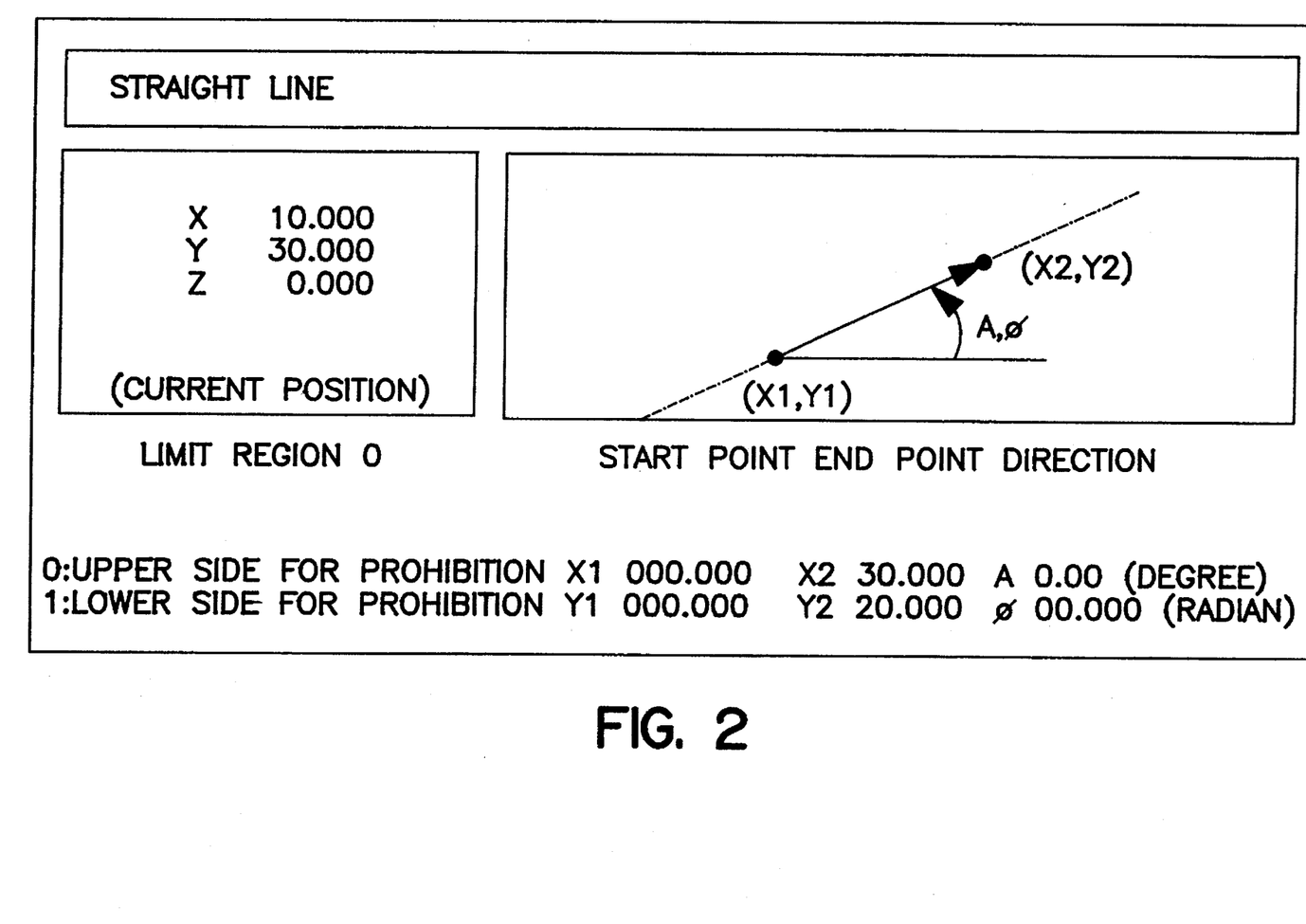
FIG. 2 is a view of a display screen for specifying a zone by a straight line in accordance with the embodiment of the present invention.
Figure 3:
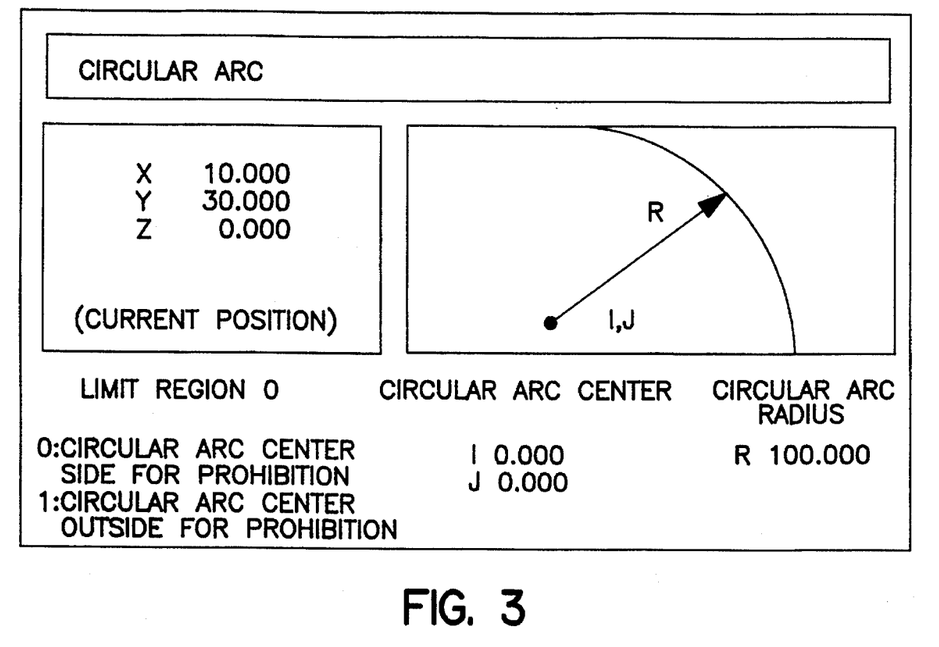
FIG 3 is a view of a display screen for specifying a zone by a circular arc in accordance with the embodiment of the present invention.

FIG. 1 is a view of a display screen for specifying a zone by a circle in accordance with the embodiment of the present invention; FIG. 2 is a view of a display screen for specifying a zone by a straight line in accordance with the embodiment of the present invention, and FIG. 3 is a view of a display screen for specifying a zone by a circular arc in accordance with the embodiment of the present invention.

In specifying a zone according to the embodiment of the present invention, a zone is specified based on a basic figure such as a circle, a straight line, or a circular arc.

To specify a zone by a circle, a circle is defined by inputting, for example, the coordinates of the center and radius of the circle, and then the range is specified by specifying the inside or outside of the circle. For specifying a zone by a straight line, a straight line is defined by inputting, for example, the coordinates of two points or the coordinates of one point and the angle of a line segment, and the zone is specified by specifying upper or lower side or right or left side of the straight line. For specifying a zone by a circular arc, a circular arc is defined by inputting, for example, the coordinates of the center and radius of circular arc, and a zone is specified by specifying the same side as or the opposite side to the center of the circular arc.

Other zones can be specified by combining basic figures such as those of the aforementioned zone specification by a circle, zone specification by a straight line, or zone specification by a circular arc. For example, a triangular zone can be specified by combining the zones by three straight lines.

In the embodiment of the present invention, the zone is specified on a display screen such as a CRT. FIGS. 1 to 3 show one embodiment of the display screen for specification. As shown in the diagrams, the data on each display is divided into a section for displaying the specified shape, a section for displaying the current position of the moving part to be controlled, a section for displaying the specified figure, a section for displaying the data defining the specified figure, and a section for determining the zone to be specified either as the moving zone or prohibited zone of the moving part to be controlled.

In the section displaying the current position of the moving part to be controlled on the screen, the current position is displayed by the position data from a non illustrated control unit. Other sections are for display in accordance with the input value from a non illustrated input device.

The zone specification by a basic figure in accordance with the embodiment of the present invention including zone specification by a circle, zone specification by a straight line, and zone specification by a circular arc, will be described below with reference to FIGS. 1 to 3.

(Zone Specification by a Circle)

FIG. 1 shows a display screen for specifying a zone by a circle on a display screen such as a CRT used for the zone specification in the embodiment of the present invention. In FIG. 1, that the currently specified shape of zone is a circle is indicated, for example, in the form of the title display; the current position of the moving part to be controlled as the coordinate data of X, Y and Z axes; the currently specified shape by a figure shape of a circle; the coordinate data of the center of circle by the values of I and J; and the radius of circle by the value of R. Also, that the inside of the circle is the prohibition zone is indicated by the selection of the movement zone and the prohibition zone in the limit region.

For the figure shape currently specified graphic of circle, the values of coordinate data I and J of the center of circle and the value of radius R of the circle are inputted, and the figure can be displayed on the screen by the internal processing in accordance with these values. The specification of the figure shape can be made by setting the tool diameter $\phi$ and considering the set tool diameter $\phi$.

(Zone Specification by a Straight Line)

FIG. 2 shows a display screen for specifying a zone by a straight line on a screen such as a CRT used for the zone specification in the embodiment of the present invention. In FIG. 2, that the currently specified shape of zone is a straight line is indicated by the title display; the current position of the moving part to be controlled is, like the zone specification by a circle, indicated by the coordinate data of X, Y and Z axes; the currently specified shape by a figure shape of straight line; and the coordinate data of the start point and the end point of the straight line by X1, Y1 and X2, Y2, or by the coordinate data X1 and Y1 the start point of the straight line and by angle A indicating the direction of the straight line. This straight line is set as a line segment defined by aforesaid two points or one point and an angle and extends toward both directions. The value $\phi$ sets the tool diameter.

That the upper side of the straight line is the prohibition zone is indicated by the selection of the movement zone and the prohibition zone in the limit region. In this embodiment, the limit region is specified by the upper or lower side of the straight line when viewed facing the front of the screen. However, the limit region can also be specified by the right or left side of the straight line when viewed facing the front of the screen. For the figure currently specified shape of straight line specified, the coordinate data X1, Y1 and X2, Y2 of the start point and the end point of the straight line or the coordinate data X1, Y1 of the start point of the straight line and the angle A indicating the direction of the straight line are inputted, and the figure can be displayed on the screen by the internal processing in accordance with these values.

(Zone Specification by a Circular Arc)

FIG. 3 shows a display screen for specifying a zone by a circular arc on a display screen such as a CRT used for the zone specification in the embodiment of the present invention. In FIG. 3, that the currently specified shape of zone is a circular arc is indicated by the title display; the current position of the moving part to be controlled is, like the zone specification by a circle or a straight line, indicated by the coordinate data of X, Y and Z axes; the currently specified shape by a figure shape of circular arc; the coordinate data of the center of circular arc by the values of I and J; and the radius of circular arc by the value of R. Also, that the side on which the center of circular arc lies is the prohibition zone is indicated by the selection of the movement zone and the prohibition zone in the limit region.

For the currently specified figure shape of circular arc, the values of coordinate data I and J of the center of circular arc and the value of radius R of the circular arc are inputted, and the figure can be displayed on the screen by the internal processing in accordance with these values. The specification of the figure shape can also be made by setting the tool diameter φ and by considering the tool diameter φ. If the center of circular arc cannot be displayed on the screen, a virtual center can be displayed.

Also, in the above-described zone specification by a circle, zone specification by a straight line, and zone specification by a circular arc, the limit region of the movement zone or the prohibition zone of the moving part to be controlled can be distinguished by any display technique such as color, pattern, or flash display on the screen.

(Configuration of Numerical Control Unit of Embodiment of the Present Invention)

The configuration of a numerical control unit used for the embodiment of the present invention will be described below with reference to the block diagram shown in FIG. 4. The application of the present invention is not limited to this numerical control unit, but the present invention can be applied to other apparatuses having means for performing zone specification.

Figure 4:
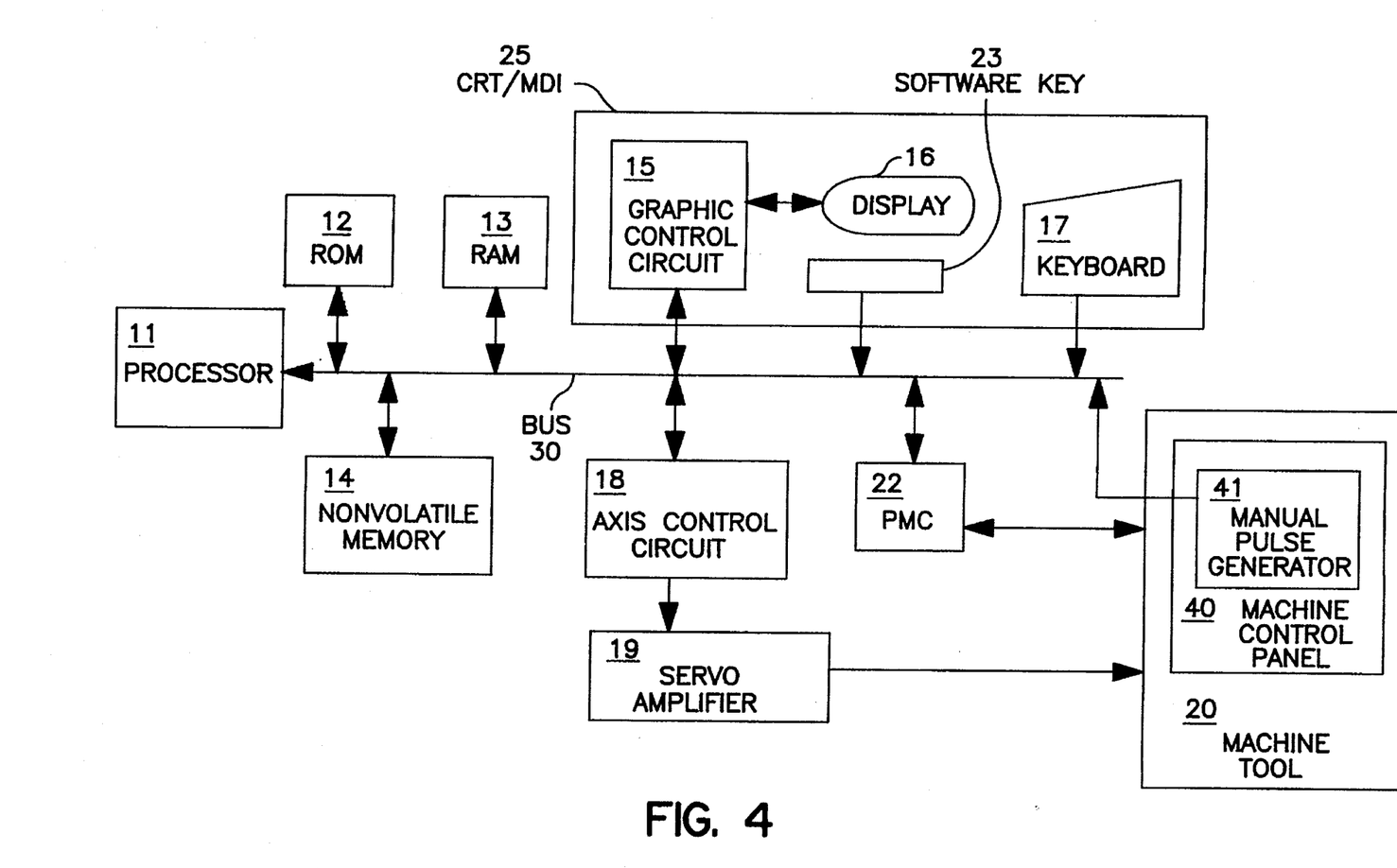
FIG. 4 is a block diagram of a numerical control unit capable of carrying out the embodiment of the present invention.

In FIG. 4, a processor 11 controls the entire numerical control unit in accordance with a system program stored in ROM 12. The software to be executed by the system program of this ROM 12 has functions such as figure storage, interpolation, etc. For the ROM 12, EPROM or EEPROM is used. RAM 13, which uses SRAM etc., stores temporary data such as input/output signal. A nonvolatile memory 14 uses CMOS backed up by a not non illustrated battery. The nonvolatile memory 14 stores various data such as parameters which should be kept even after power shutoff, and machining program.

A graphics control circuit 15 converts the guidance information, inputted specified shape, etc. into a signal which can be displayed, and gives the signal to a display 16. The display 16 uses a CRT or a liquid crystal display device. An axis control circuit 18 (for three axes), receiving the movement command of axis including the interpolation pulse CP from the processor 11, outputs the movement command of this axis to a servo amplifier 19 (for three axes). The servo amplifier 19, receiving this movement command, drives a non illustrated servomotor of a machine tool 20. The machine tool 20 has a machine control panel 40 to be used in executing the movement command in addition to driving the servomotor. These components are connected to each other by a bus 30.

A PMC (Programmable Machine Controller) 22 receives T function signal (tool selection command) etc. via the bus 30 during the execution of the machining program. This signal is processed by a sequence program, and is outputted as the operation command to control the machine tool 20. Also, the PMC receives a state signal from the machine tool 20, performs sequence processing, and transmits an input signal necessary for the processor 11 via the bus 30.

Connected to the bus 30 is a software key 23, whose function is changed by the system program etc. The software key 23 is provided in a CRT/MDI unit 25 together with the display 16 and a keyboard 17.

[Operation of Embodiment]

Next, the operation of the embodiment of the present invention will be described.

(Specification of Zone)

Figure 5:
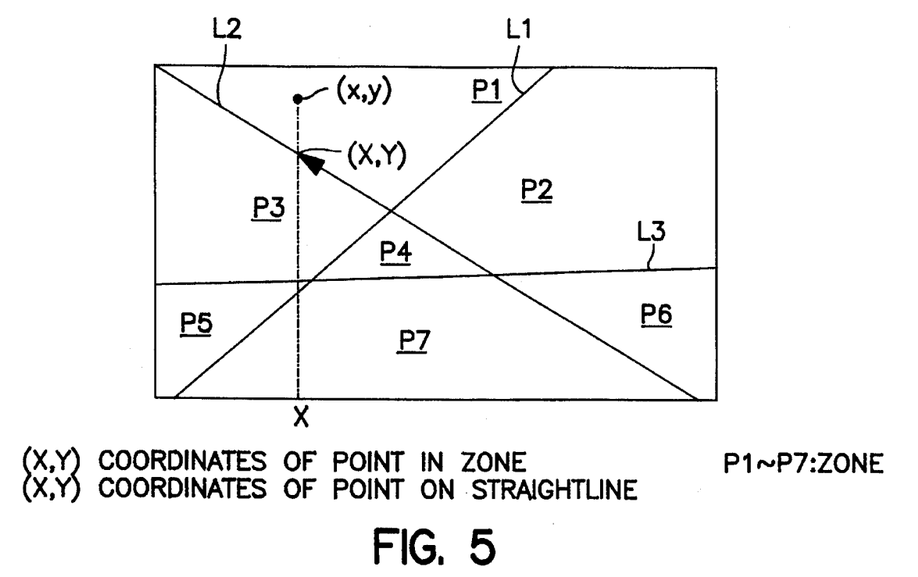
FIG. 5 is a view of a display screen for specifying a zone by combining straight line zones.
Figure 6:
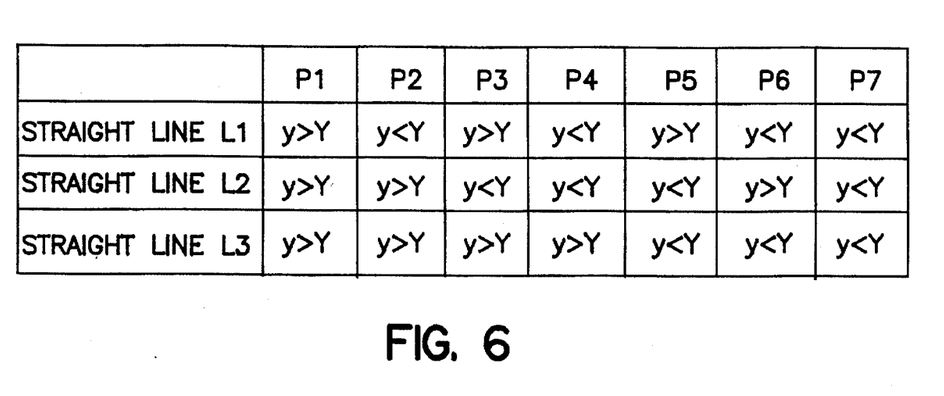
FIG. 6 is a table showing the conditions for specifying a zone by combining straight line zones.

First, a case will be described in which various zones are specified by combining basic figures of circles, straight lines, or circular arcs. (Example 1) FIGS. 5 and 6 show a case in which a zone is specified by combining straight line zones. FIG. 5 shows zone displayed on a screen, and FIG. 6 shows the conditions for zone specification.

In FIG. 5, a zone is specified by three straight lines L1, L2, and L3. The zone is divided into seven zones P1 to P7 by these three straight lines. For example, zone P1 is set as a zone lying on the upper sides of all the straight lines L1, L2, and L3. When an arbitrary point in this zone P1 is expressed by coordinates (x, y), the values of Y coordinate of straight lines L1, L2 and L3 corresponding to the x coordinate are Y1, Y2 and Y3, respectively. The condition that point (x, y) lies in zone P1 holds when all inequalities of y>Y1 for straight line L1, y>Y2 for straight line L2, and y>Y3 for straight line L3 are satisfied, as shown in FIG. 6.

Similarly, for other zones P2 to P7, zone specification can be performed by the conditions shown in FIG. 6.

The values of Y coordinate of the straight lines L1, L2 and L3 corresponding to x coordinate can be determined, for example, by substituting x coordinate into the expression representing respective straight lines L1, L2 and L3. The calculation by the conditional inequality in this zone specification can be performed in the processor 11.

Figure 7:
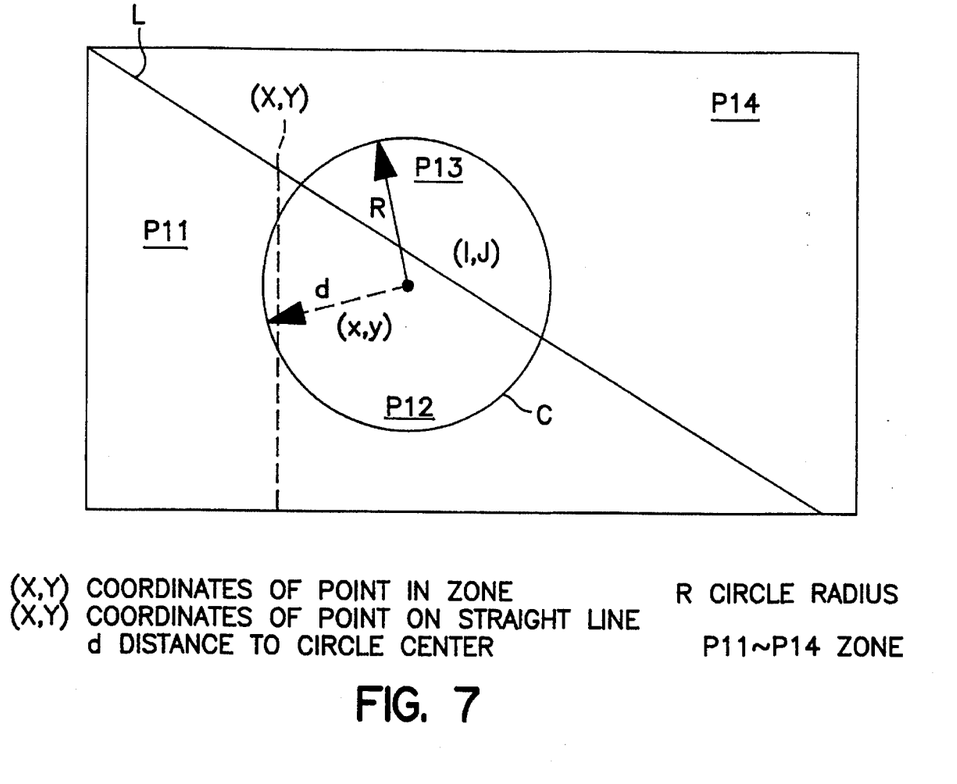
FIG. 7 is a view of a display screen for specifying a zone by combining circle zones.
Figure 8:
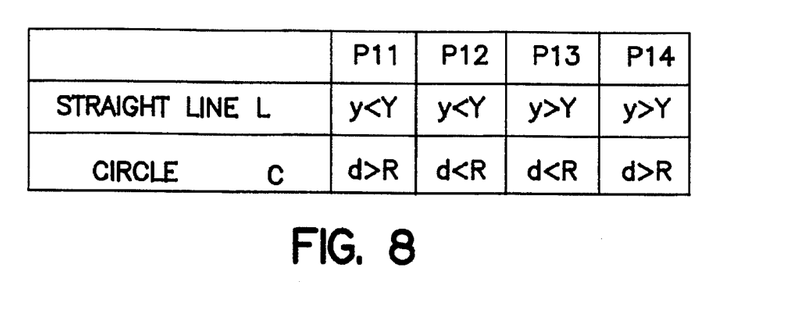
FIG. 8 is a table showing the conditions for specifying a zone by combining circle zones.

For the above-described zone specification, it is not necessary to set conditions of zone specification as shown in FIG. 6 for all zones P1 to P7 formed by being divided by straight lines L1 to L3. Thus, the condition is inputted only for the zone to be specified so that only the necessary zone can be specified. (Example 2) FIGS. 7 and 8 show a case in which a zone is specified by combining straight line zone and circle zone. FIG. 7 shows zones displayed on a screen, and FIG. 8 shows the conditions for zone specification.

In FIG. 7, a zone is specified by one straight line L and one circle C with radius R. The zone is divided into four zones P11 to P14 by one straight line and one circle. For example, zone P11 is set as the zone lying on the lower side of straight line L and on the outside of circle C, while zone P12 is set as the zone lying on the lower side of straight line L and on the inside of circle C. When an arbitrary point in this zone P12 is represented by coordinates (x, y), the values of Y coordinate of straight lines L corresponding to x coordinate is Y. The distance d between the coordinate (x, y) and the center (I, J) of circle C can be expressed as $d=((x-I)^2+(y-J)^2)^{1/2}$. The condition that point (x, y) lies in zone P12 is to satisfy both the inequalities of y<Y for straight line L and d<R for circle C, as shown in FIG. 8.

Similarly, other zones P11, P13 and P14 can be specified by the condition of inequality for straight line L and the condition of inequity for circle C as shown in FIG. 8.

It is apparent that the conditional expression for zone specification differs depending on the defining expressions of straight line and circle.

For the above-described zone specification, it is not necessary to set conditions for zone specification as shown in FIG. 8 for all zones P11 to P14 formed by being divided by straight line L and circle C. Thus, the condition is inputted only for the zone to be specified so that only the necessary zone can be specified.

(Movement Control in a Zone)

The movement control for the moving part to be controlled will be described below with reference to FIGS. 9 to 16, by using the zone such as the movement zone and the prohibition zone specified by the above-described zone specification method of the present invention.

Figure 9:
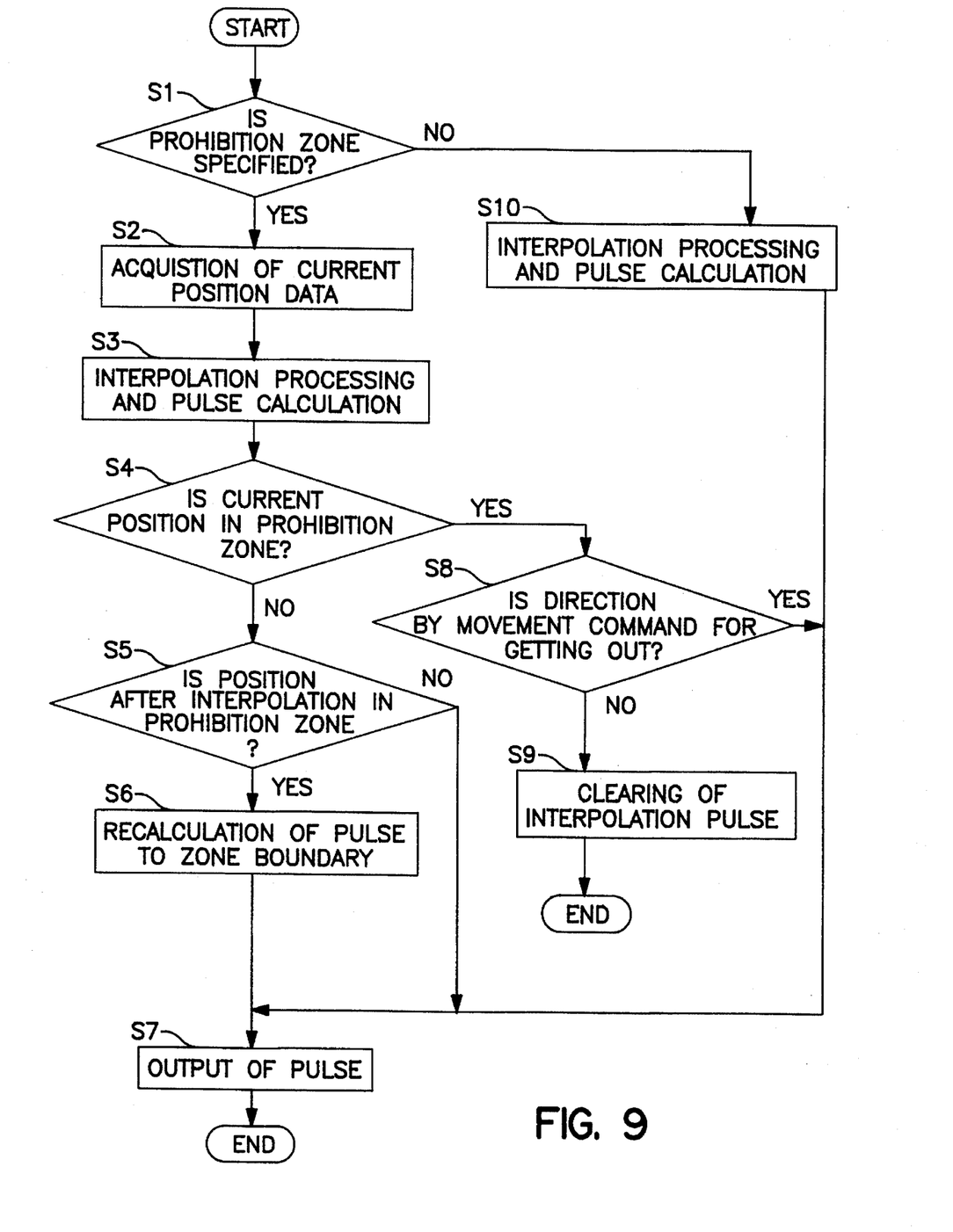
FIG. 9 is a flowchart illustrating the control of the movement of moving part to be controlled in the specified zone in accordance with the embodiment of the present invention.
Figure 10:
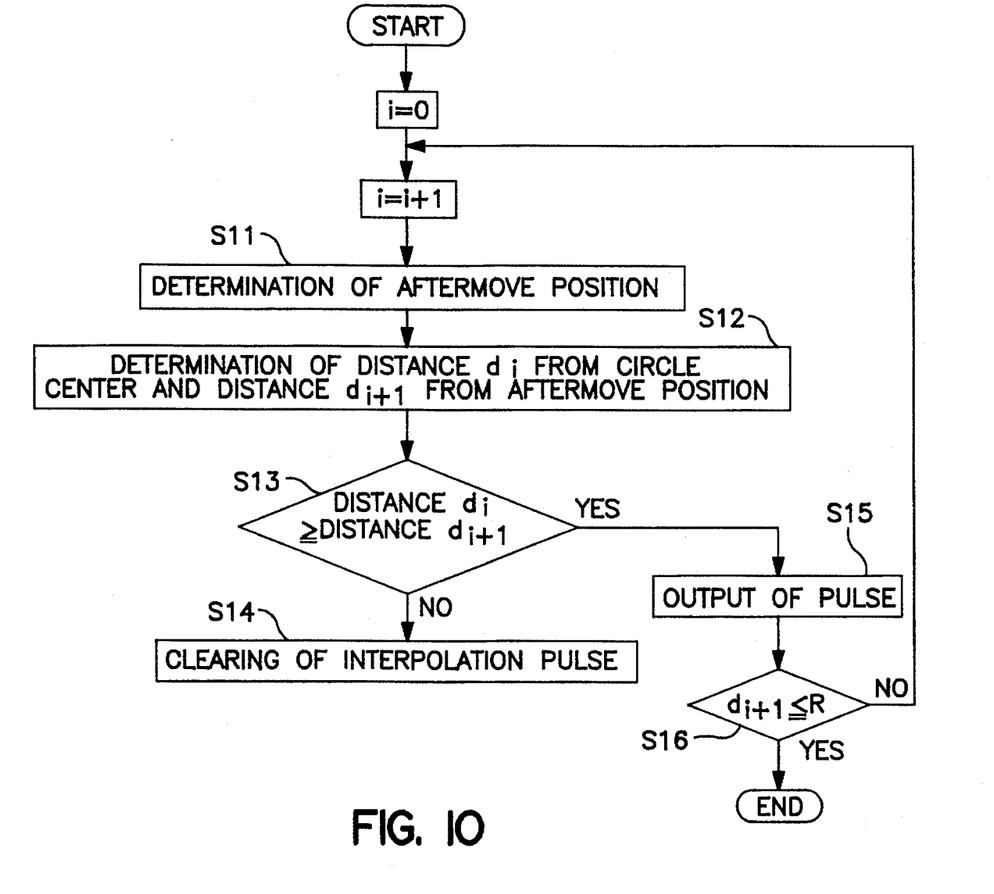
FIG. 10 is a flowchart for determining whether the movement command of the present invention specifies the direction in which the controlled moving part is allowed to get out of a prohibition zone to a movement zone.
Figure 11:
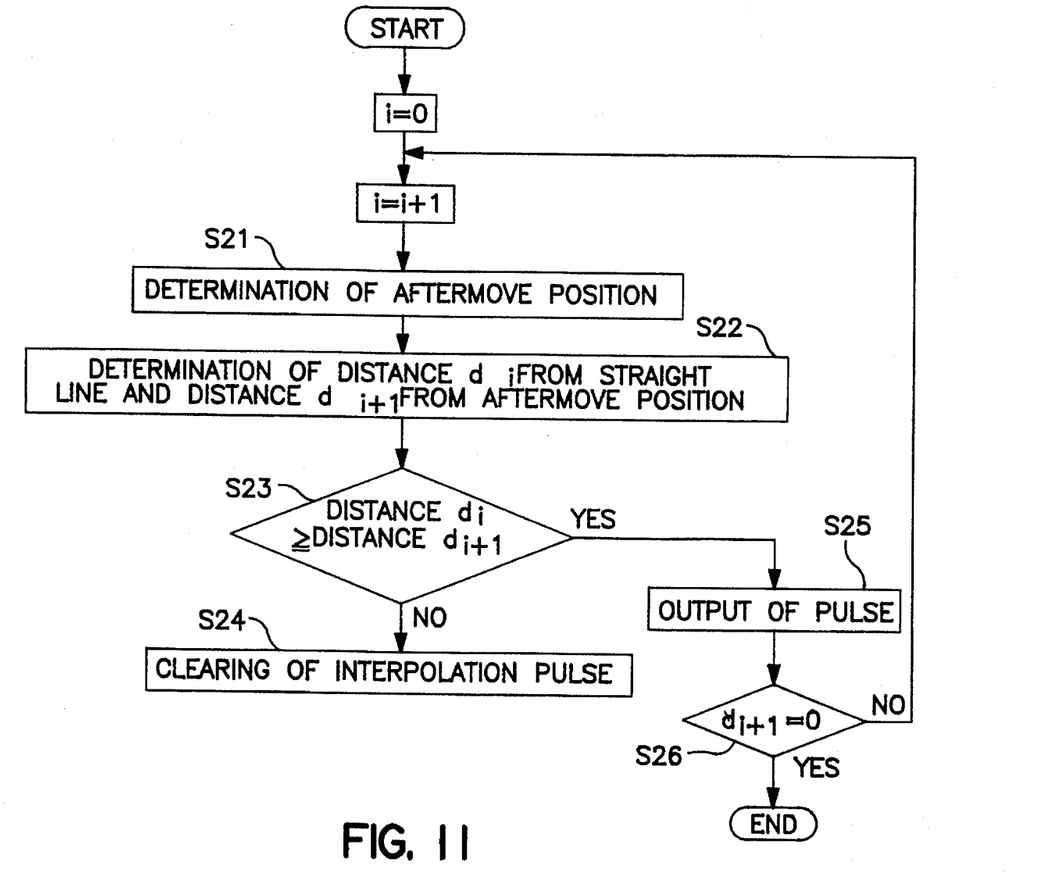
FIG. 11 is a flowchart for determining whether the movement command of the present invention specifies the direction in which the controlled the controlled moving part is allowed to get out of a prohibition zone to a movement zone.
Figure 12:
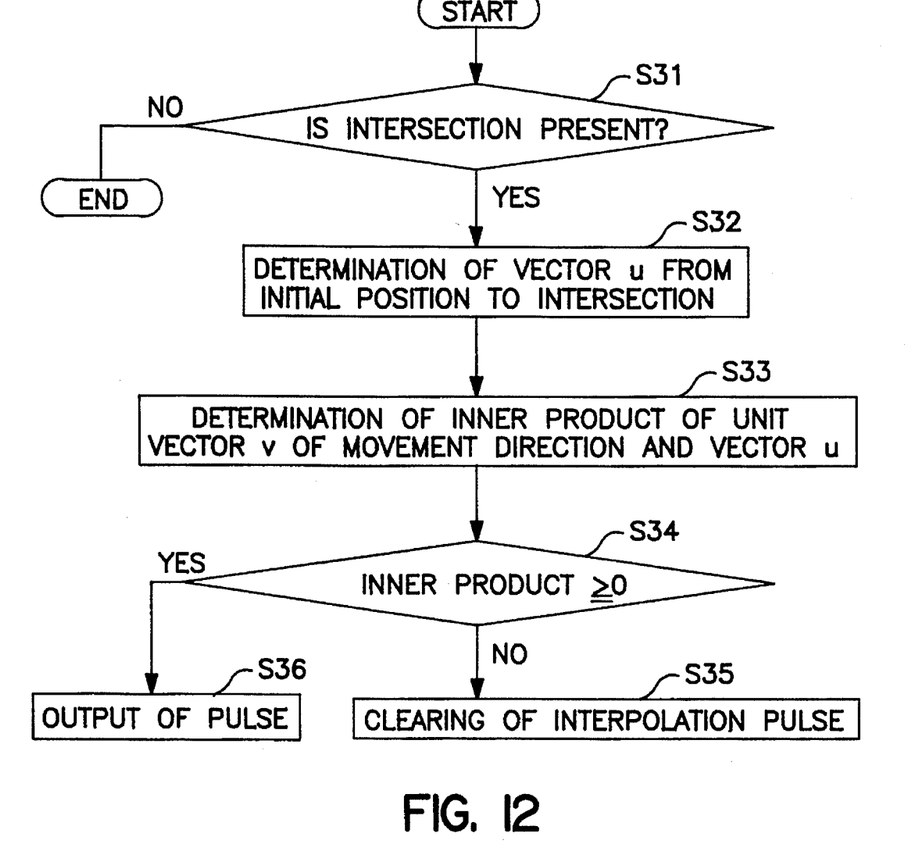
FIG. 12 is a flowchart for determining whether the movement command of the present invention specifies the direction in which the controlled moving part is allowed to get out of a prohibition zone to a movement zone.

FIG. 9 is a flowchart illustrating the movement control of the moving part being controlled in the specified zone of the embodiment of the present invention. FIGS. 10, 11 and 12 are flowcharts for determining whether the movement command is for in the direction in which the moving part being controlled is allowed to get out of the prohibition zone to the movement zone. FIGS. 13 to 16 are diagrams for illustrating the process for determining whether the movement command is for the direction in which the moving part to be controlled is allowed to get out of the prohibition zone to the movement zone.

First, the movement control of the moving part to be controlled will be described referring to the flowchart of FIG. 9 and in accordance with step S.

Step S1: First, it is determined whether the prohibition zone, in which the movement of the moving part to be controlled is prohibited in the zone specification, is specified.

When, a zone is specified in advance by using the keyboard 17 etc. while referring to the content of the display on the screen of the display 16, the data of the specified zone is stored in the nonvolatile memory 14. The processor 11 calls the nonvolatile memory 14, and determines whether the prohibition zone is present.

Step S2: If the result of judgment in Step S1 indicates that prohibition zone is specified, the processor 11 detects the current position of the moving part to be controlled to acquire the position data, and stores it in the memory such as the RAM 13.

Step S3: The processor 11 calls the nonvolatile memory 14 to determine the target position data of the moving part to be controlled, executes interpolation processing of the numerical control unit between the current position acquired in Step S2 and the target position of the moving part to be controlled, executes pulse calculation for driving the pulse motor, and stores the result in the memory such as the RAM 13.

Step S4: Next, the processor 11 calls the position data for the current position stored in the memory such as the RAM 13, and determines whether the current position of the moving part to be controlled is in the prohibition zone, from the data of prohibition zone stored in the memory such as the nonvolatile memory 14. This determination can be made by applying the current position data of the moving part to be controlled to the conditional expression such as an inequality which specifies the prohibition zone.

Step S5: As a result of the determination in Step S4, if the current position of the moving part to be controlled is in the movement zone, not in the prohibition zone, the processor 11 reads the target position data of the moving part to be controlled, which is stored in the memory such as the RAM 13, and determines whether the position of the moving part to be controlled after interpolation is in the prohibition zone. This determination can be made by applying the position data of the moving part to be controlled after interpolation to the conditional expression such as an inequality which specifies the prohibition zone.

Step S6: As a result of the determination in Step S5, if the position of the moving part to be controlled after interpolation is in the prohibition zone, the pulse to the zone boundary on the line connecting the current position and the position after interpolation is calculated. By this pulse calculation, a pulse signal can be acquired, which causes the moving part to be controlled to be moved up to the point immediately before the boundary of the movement zone and the prohibition zone.

Step S7: The interpolation pulse determined in the process of Step S6 is outputted. This pulse output allows the moving part to be controlled to be moved up to the point immediately before the boundary of a zone and the prohibition zone.

Step S10, S7: If the result of judgment in Step S1 indicates that the prohibition zone, in which the movement of the moving part being controlled is prohibited, is not specified, since there is no limit to the movement zone of the moving part to be controlled, pulse calculation for movement is executed after interpolation processing, and the interpolation pulse is outputted in Step S7. By this output of interpolation pulse, the moving part to be controlled moves to the intended end position of movement.

Step S8: If the result of judgment in Step S4 indicates that current position of the moving part to be controlled is in the prohibition zone, when the moving part to be controlled is moved in the direction commanded by the movement command at that time, it is determined whether or not the moving part to be controlled enters the movement zone from the prohibition zone. For this purpose, it is determined whether the direction commanded by the movement command is the direction in which the moving part to be controlled is allowed to get out of the prohibition zone.

If the the movement command specifies the direction in which the moving part to be controlled is allowed to get out of the prohibition zone, pulse is outputted in Step S7 by using the pulse calculated in the process of Step S3, by which the movement is executed.

The determination of the direction commanded by the movement command will be described in the later section dealing with (Determination of Direction of Movement Command), with reference to FIGS. 10 to 16.

Step S9: If the result of judgment in Step S8 indicates that direction commanded by the movement command is not the direction in which the moving part to be controlled is allowed to get out of the prohibition zone, the interpolation pulse calculated in the process of Step S3 is cleared to complete the processing.

(Determination of Direction commanded by Movement Command)

Next, the direction commanded by the movement command in Step S8 is checked, and it is determined whether the movement direction is the direction in which the moving part to be controlled moves from the prohibition zone to the movement zone.

One embodiment of the flow of processing applied in the case where the zone is specified by a circle, one embodiment of the flow of processing applied in the case where the zone is specified by a straight line, and one embodiment of the flow of processing applied in the case where the zone is specified by a circle, straight line, and a circular arc will be described below. (1) First, one embodiment of the flow of processing applied in the case where the zone is specified by a circle, and the outside of the zone is the prohibition zone, will be described with reference to the flowchart shown in FIG. 10 and the symbols used in Step S11 to S16.

Step S11: The end position of the movement of the moving part to be controlled at a certain point of time is determined based on the movement command and the interpolation pulse.

Step S12: The distance $d_i$ at a certain point of time between the aftermove position of the moving part to be controlled determined in Step S11 and the center of the circle and the distance $d_{i+1}$ at the next point of time are determined. Thereupon, the fine movement of the moving part to be controlled during an extremely short period of time can be detected.

Step S13: The distance $d_i$ at a certain point of time determined in Step S12 is compared with the distance $d_{i+1}$ at the next point of time, and it is determined whether the moving part to be controlled moves toward the center of the circle.

Step S14: If the distance $d_i$ at a certain point of time is larger than the distance $d_{i+1}$ at the next point of time, the moving part to be controlled moves in the direction in which it departs from the center of the circle. Therefore, the interpolation pulse determined in Step S3 is cleared so as not to make the movement. This process corresponds to Step S9 in FIG. 9.

Step S15: If the distance $d_i$ at a certain point of time is smaller than the distance $d_{i+1}$ at the next point of time, the moving part to be controlled moves in the direction in which it approaches the center of the circle. Therefore, the interpolation pulse is outputted to make the movement. This process corresponds to Step S7 in FIG. 9.

Step S16: By repeating the processes from Step S11 to Step S13, the number of pulses by which the moving part to be controlled enters the circle is determined. This determination of whether or not the moving part to be controlled enters the circle is made by comparing the distance $d_{i+1}$ with the circle radius R.

The example of the above-described flow of processing will be explained with reference to FIGS. 14 and 15, which illustrate the determination of the direction specified by the movement command in the case where the zone is specified by a circle.

Figure 14:
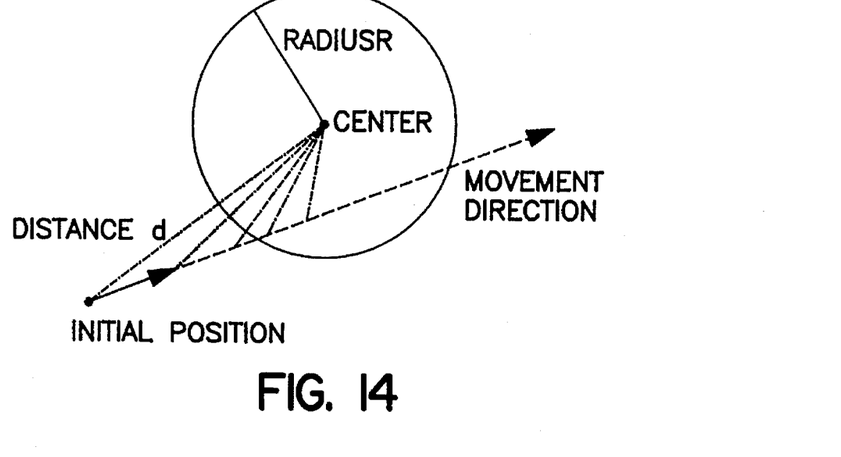
FIG. 14 is a diagram illustrating the process of determining whether the movement command of the present invention specifies the direction in which the moving part under control is allowed to get out of a prohibition zone to a movement zone.

For example, FIG. 14 shows a case where, when the inside of the circle is the movement zone and the outside of the circle is the prohibition zone, the direction specified by the movement command is the direction in which that the moving part to be controlled allowed to get out of the prohibition zone to the movement zone. The movement direction specified by the movement command is indicated by the broken line. This broken line intersects the circle. The distance d between a point on the movement path and the center of the circle gradually decreases with the movement, and the moving part to be controlled reaches a point on the circumference at a certain point of time. This point on the circumference corresponds to the boundary of the zone, and the moving part to be controlled is allowed to get out of the prohibition zone to the movement zone by continuing to move further.

Figure 15:
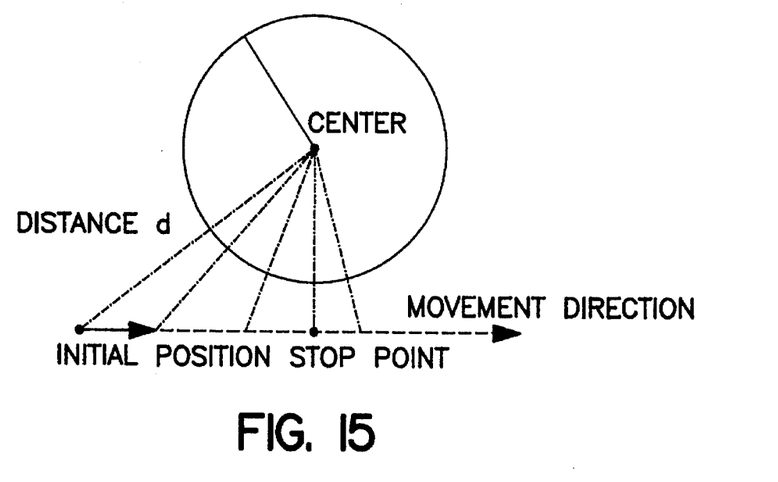
FIG. 15 is a diagram illustrating the process of determining whether the movement command of the present invention specifies the direction in which the moving part under control is allowed to get out of a prohibition zone to a movement zone.

FIG. 15, like FIG. 14, shows a case where when the inside of the circle is the movement zone and the outside of the circle is the prohibition zone, the direction commanded by the movement command is the direction in which the moving part to be controlled is allowed to get out of the prohibition zone to the movement zone. In this case, the direction of movement indicated by the broken line does not intersect the circle as shown in FIG. 15. The distance d between a point on the movement path and the center of the circle gradually decreases with the movement, but the distance d increases after passing a certain point of time. Thus, the movement by this movement command will not cause the moving part to be controlled to get out of the prohibition zone to the movement zone but causes it stops at a point of time at which it approaches most to the center of the circle.

(2) Next, one embodiment of the flow of processing applied in the case where the zone is specified by a straight line and the outside of the zone is the prohibition zone will be described with reference to the flowchart shown in FIG. 11 and the symbols used in Step S21 to S26.

Step S21: The aftermove position of the moving part to be controlled at a certain point of time is determined based on the movement command and the interpolation pulse.

Step S22: The distance $d_i$ between the aftermove position of the moving part to be controlled determined in Step S11 and the straight line at a certain point of time, and the distance $d_{i+1}$ at the next point of time are determined. Thereupon, the movement of the moving part to be controlled during an extremely short period of time can be detected. The distance to the straight line can be obtained by determining the length of the normal line drawn from the point to the straight line.

Step S23: The distance $d_i$ at a certain point of time determined in Step S22 is compared with the distance $d_{i+1}$ at the next point of time, and it is determined whether the moving part to be controlled moves toward the straight line.

Step S24: If the distance $d_i$ at a certain point of time is smaller than the distance $d_{i+1}$ at the next point of time, the moving part to be controlled moves in the direction in which it departs from the straight line, so that the interpolation pulse determined in Step S3 is cleared, and no further movement is made. This process corresponds to Step S9 in FIG. 9.

Step S25: If the distance $d_i$ at a certain point of time is larger than the distance $d_{i+1}$ at the next point of time, the moving part to be controlled moves in the direction in which it approaches the straight line. Therefore, the interpolation pulse is outputted. This process corresponds to Step S7 in FIG. 9.

Step S26: By repeating the processes from Step S21 to Step S23, the number of pulses at which the moving part to be controlled intersects the straight line is determined. This determination of whether or not the moving part to be controlled enters the movement zone is made by checking if the distance $d_{i+1}$ equals zero.

The example of the above-described flow of processing will be explained with reference to FIG. 16, which illustrates the determination of the direction commanded by the movement command in the case where the zone is specified by a straight line.

Figure 16:
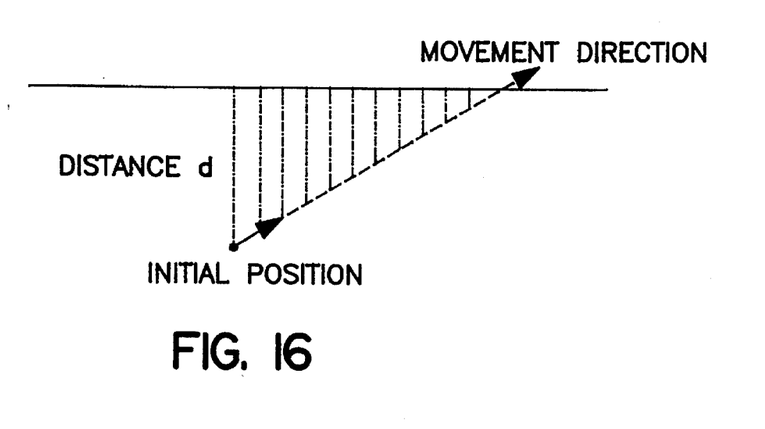
FIG. 16 is a diagram illustrating the process of determining whether the movement command of the present invention specifies the direction in which the moving part under control is allowed to get out of a prohibition zone to a movement zone.

For example, FIG. 16 shows a case where, when the upper side of the straight line is the movement zone and the lower side of the straight line is the prohibition zone, the direction commanded by the movement command is the direction in which the moving part to be controlled is allowed to get out of the prohibition zone to the movement zone. The direction of movement commanded by the movement command is indicated by the broken line. This broken line intersects the straight line. The distance d between a point on the movement path and the straight line gradually decreases with the movement, and the moving part to be controlled intersects the straight line at a certain point of time. This intersection corresponds to the boundary of the zone, and the moving part to be controlled is allowed to get out of the prohibition zone to the movement zone as it moves further.

Figure 13:
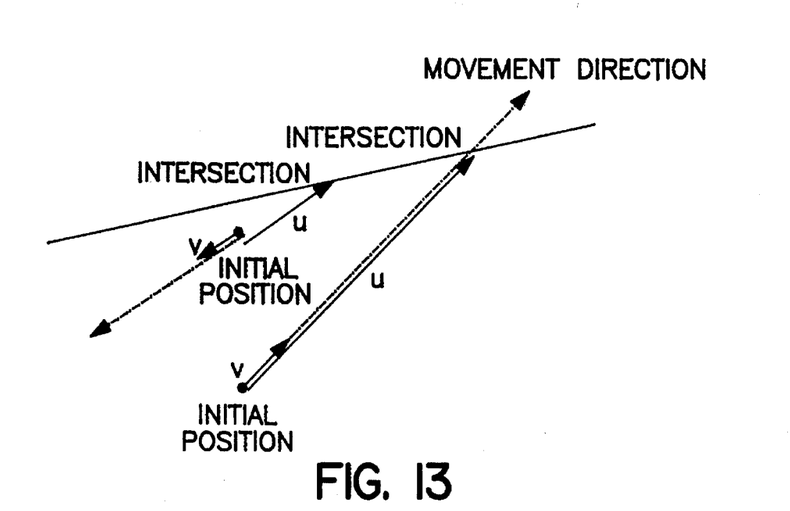
FIG. 13 is a diagram illustrating the process of determining whether the movement command of the present invention specifies the direction in which the moving part under control is allowed to get out of a prohibition zone to a movement zone.

In FIG. 16, when the movement direction indicated by the broken line is reversed, the distance d between a point on the movement path and the straight line gradually increases with the movement. The movement by this movement command will not allow the moving part to be controlled to get out of the prohibition zone to the movement zone. (3) Next, one embodiment of the flow of processing applied in the case where a zone is specified by a circle, a straight line, or a circular arc will be described with reference to FIG. 13, illustrating whether the movement command is for getting out of the prohibition zone to the movement zone, and the flowchart shown in FIG. 12, referring to the symbols used for Step S31 to S36.

Step S31: It is determined, on the bases of the movement command and the interpolation pulse, whether there is a boundary of the specified zone on the extension of the movement direction. This determination is made by checking if there is an intersection among the circle, the straight line or the circular arc and the straight line of the movement direction.

Step S32: Next, a vector u is determined from the initial position of the movement direction and the intersection determined in the process of Step S31. For example, in FIG. 13, the vector u connecting the initial position and the intersection is indicated by the thick solid line.

Step S33: Further, a unit vector v of the movement direction commanded by the movement command is determined, and the inner product of this unit vector v and the vector u, determined in Step S32, is determined.

Step S34: It is determined whether the sign of the inner product determined in Step S33 is positive or negative. Thereupon, the relationship between the movement direction and the direction from the initial position to the intersection can be determined. That is, if the inner product is positive, the movement direction is the same as the direction from the initial position to the intersection. If the inner product is negative, the movement direction is opposite to the direction from the initial position to the intersection.

Step S35: Since when the inner product is negative, the movement direction is opposite to the direction from the initial position to the intersection, so that the interpolation pulse is cleared, and no movement is made. This process corresponds to Step S9 in FIG. 9.

Step S36: Since, when the inner product is positive, the movement direction is the same as the direction from the initial position to the intersection, the interpolation pulse is outputted. This process corresponds to Step S7 in FIG. 9.

(Example of Application of Embodiment to Machine Tool)

Next, a case where the embodiment of the present invention is applied to a machine tool will be described.

Figure 17:
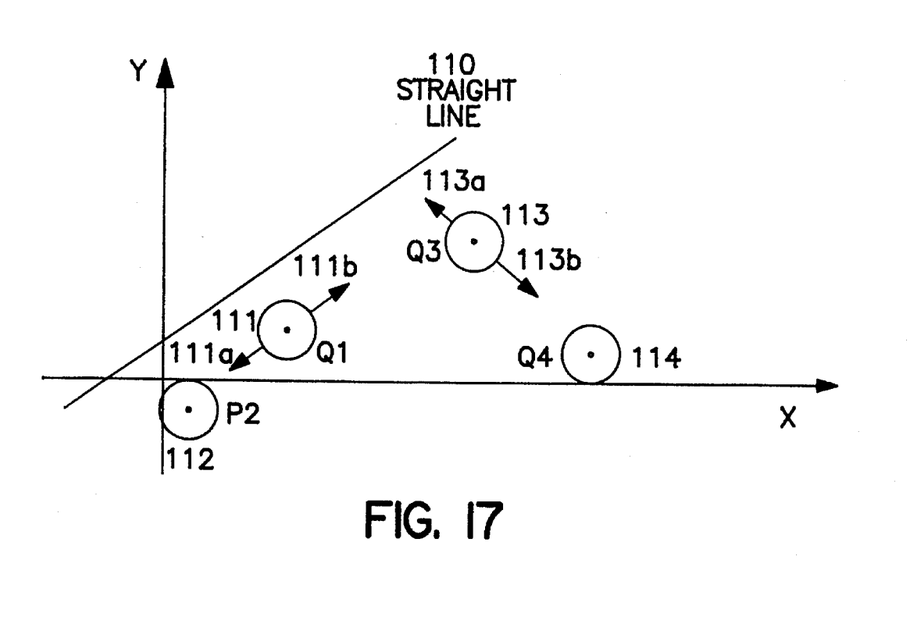
FIG. 17 is a diagram illustrating a case where straight line zone specification of the present invention is applied to a machine tool.

First, an example in which the zone is specified by straight lines will be described with reference to FIG. 17. In FIG. 17, on the X-Y coordinate axis plane, the upper side of a straight line 110 is specified as the prohibition zone. This straight line 110 can be stored in, for example, the nonvolatile memory 14, and can be called by the processor 11. The center of a tool 111 lies at position Q1, and the center of a tool 113 lies at position Q3.

At this time, parallel movement is selected by the machine control panel 40 of the machine tool 20, and jog feed or handle feed is performed. Thereupon, the tool 111 moves in the direction 111a or 111b in parallel with the straight line 110.

When vertical movement is selected by the machine control panel 40 of the machine tool 20, and jog feed or handle feed by a manual pulse generator 41 is performed, the tool 113 moves along the direction 113a or 113b and in the normal direction with respect to the straight line 110.

For the movement of this tool, a function for stopping output of the interpolation pulse by the input of a predetermined coordinate value can be added.

Figure 18:
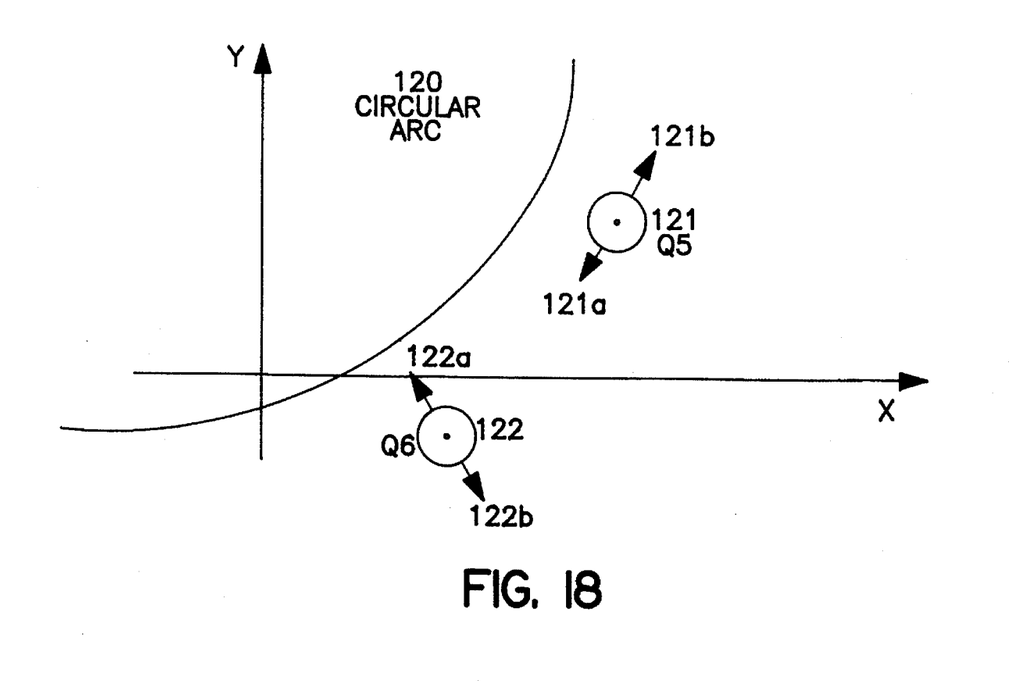
FIG. 18 is a diagram illustrating a case where circle zone specification of the present invention is applied to a machine tool.

Next, an example in which a zone is specified by a circular arc will be described with reference to FIG. 18. In FIG. 18, on the X-Y coordinate axis plane, the upper side of a circular arc 120 is specified as the prohibition zone. This circular arc 120 can be stored in, for example, the nonvolatile memory 14, and called by the processor 11. The center of a tool 121 lies at position Q5, and the center of a tool 122 lies at position Q6.

At this time, parallel movement is selected by the machine control panel 40 of the machine tool 20, and jog feed or handle feed by the manual pulse generator 41 is performed. Thereupon, the tool 121 moves in the direction 121a or 121b while keeping a fixed distance from the circular arc 120. The fixed distance at this time is a normal component between the tool position 121 and the circular arc 120.

When vertical movement is selected by the machine control panel 40 of the machine tool 20, and jog feed or handle feed is performed, the tool 122 moves along the direction 122a or 122b and in the normal direction with respect to the circular arc 120.

According to this embodiment, the machining zone can easily be set by basic figures defined by a straight line, a circle, or a circular arc.

In the above embodiment, the zone specifications such as the movement zone specification or the prohibition zone specification for the moving part to be controlled are made by the zone specification by a circle, zone specification by a straight line, or the zone specification by a circular arc, or by the combination of these methods. However, in the specifying a polygonal zone by the combination of a plurality of straight lines, the polygonal zone is set in advance so that the zone specification can also be made by using the polygonal zone.

It is also possible to previously set a figure obtained by the combination of basic figures such as a circle, a straight line, a circular arc, etc. if necessary in consideration of frequency of use, etc.

As described above, according to the present invention, the specification of the movement zone or the prohibition zone of the moving part to be controlled can easily be made without strictly defining as numerical data the position information about the aftermove position or the movement limit of the moving part to be controlled.

We claim:

1. A method for setting a movement zone within which movement of a numerically controlled moveable machine part is permitted, comprising the steps of:

inputting data indicating a straight line and/or a circle forming a boundary shape of a movement zone;

inputting data indicating which one of two planes divided by said straight line or said circle includes said movement zone, thereby determining said movement zone;

judging whether or not a present position of a moveable machine part lies within said determined movement zone;

judging whether or not an interpolated position of said moveable machine part lies within said determined movement zone;

executing a movement of said moveable machine part when both said present position and said interpolated position of said moveable machine part lie within said determined movement zone; and executing said movement of said movable machine part to said straight line or said circle when said present position lies within said movement zone but said interpolated position does not lie within said movement zone.

2. The method of setting a movement zone according to claim 1, further comprising the step of executing said movement of said moveable machine part when said present position does not lie within said movement zone but said interpolated position lies within said moveable zone.

* * * * *